(12) United States Patent
Seitz et al.

(10) Patent No.: US 7,631,505 B2
(45) Date of Patent: Dec. 15, 2009

(54) WEARLESS VALVE FOR CRYOREFRIGERATOR

(75) Inventors: Eric Seitz, Macungie, PA (US); Jin Lin Gao, Allentown, PA (US); Ralph C. Longsworth, Allentown, PA (US); Mingyao Xu, Emmaus, PA (US)

(73) Assignees: Sumitomo Heavy Industries, Ltd., Tokto (JP); Sumitomo (SHI) Cryogenics of America, Inc., Allentown, PA (US)

( * ) Notice: Subject to any disclaimer, the term of this patent is extended or adjusted under 35 U.S.C. 154(b) by 472 days.

(21) Appl. No.: 10/581,962

(22) PCT Filed: Mar. 8, 2005

(86) PCT No.: PCT/US2005/007981

§ 371 (c)(1),
(2), (4) Date: Jun. 6, 2006

(87) PCT Pub. No.: WO2005/088210

PCT Pub. Date: Sep. 22, 2005

(65) Prior Publication Data

US 2007/0107442 A1    May 17, 2007

Related U.S. Application Data

(60) Provisional application No. 60/551,154, filed on Mar. 8, 2004.

(51) Int. Cl.
*F25B 9/00* (2006.01)
*F16K 31/02* (2006.01)
*F16K 5/00* (2006.01)

(52) U.S. Cl. .................... 62/6; 251/129.11; 251/304

(58) Field of Classification Search ............... 62/6; 251/129.11, 304
See application file for complete search history.

(56) References Cited

U.S. PATENT DOCUMENTS

| | | | | |
|---|---|---|---|---|
| 2,147,851 A | * | 2/1939 | Mallon | 137/246.22 |
| 2,319,733 A | * | 5/1943 | Hall | 123/190.14 |
| 2,832,561 A | * | 4/1958 | Holl | 251/174 |
| 3,119,237 A | | 1/1964 | Gifford | |
| 3,205,668 A | | 9/1965 | Gifford | |
| 3,237,421 A | | 3/1966 | Gifford | |
| 3,620,029 A | | 11/1971 | Longsworth | |
| 3,625,015 A | | 12/1971 | Chellis | |
| 3,677,295 A | * | 7/1972 | Schultz | 137/596.12 |
| 4,231,440 A | * | 11/1980 | Erwin | 137/246.22 |
| 4,373,476 A | | 2/1983 | Vervoordt et al. | |
| 4,925,464 A | * | 5/1990 | Rabenau et al. | 96/124 |
| 4,987,743 A | | 1/1991 | Lobb | |
| 5,315,963 A | * | 5/1994 | Warf | 123/190.12 |
| 6,256,998 B1 | | 7/2001 | Gao | |
| 6,694,749 B2 | * | 2/2004 | Heron | 62/6 |
| 2002/0066276 A1 | * | 6/2002 | Kawano et al. | 62/6 |

OTHER PUBLICATIONS

E.I. Mikulin, et al. Low Temperature Expansion Pulse Tube, Advances in Cryogenic Engineering, vol. 29, 1984, p. 629-p. 637, Moscow High Technical School, Moscow, USSR.

* cited by examiner

*Primary Examiner*—William C Doerrler
(74) *Attorney, Agent, or Firm*—Katten Muchin Rosenman LLP

(57) ABSTRACT

An improved method of reducing wear dust and torque required to turn a multi-port rotary disc valve utilizes a thrust bearing to hold the valve seat and/or valve disc such that they are not in contact with each other, or have light contact each other.

5 Claims, 10 Drawing Sheets

WEARLESS VALVE FOR CRYOREFRIGERATOR

This application is a National Phase Application of International Application No. PCT/US2005/007981, filed Mar. 8, 2005, which claims the benefit under 35 U.S.C. 119 (a-e) of U.S. Provisional Application No. 60/551,154 filed Mar. 8, 2004, which is herein incorporated by reference.

BACKGROUND OF THE INVENTION

The present invention relates to cryogenic refrigerators, in particular, Gifford McMahon (GM) refrigerators, GM type pulse tube refrigerators, and Solvay refrigerators. Coldheads of such cryogenic refrigerators include a valve mechanism, which commonly consists of a rotary valve disc and a valve seat. There are discrete ports, which, by periodic alignment of the different ports, allow the passage of a working fluid, supplied by a compressor, to and from the regenerators and working volumes of the coldhead.

GM and Solvay type refrigerators use compressors that supply gas at a nearly constant high pressure and receive gas at a nearly constant low pressure. The gas is supplied to a reciprocating expander that runs at a low speed relative to the compressor by virtue of a valve mechanism that alternately lets gas in and out of the expander.

W. E. Gifford also conceived of an expander that replaced the solid displacer with a gas displacer and called it a "pulse tube" refrigerator. This was first described in his U.S. Pat. No. 3,237,421 which shows a pulse tube connected to valves like the earlier GM refrigerators.

Early pulse tube refrigerators were not efficient enough to compete with GM type refrigerators. A significant improvement was made by Mikulin et al., as reported in 1984, and significant interest ensued in looking for further improvements. Descriptions of major improvements since 1984 can be found in the references listed herein. All of these pulse tubes can run as GM type expanders that use valves to cycle gas in and out of the pulse tube. GM type pulse tubes running at low speed are typically used for applications below about 20 K. It has been found that best performance at 4 K has been obtained with the pulse tube shown in FIG. 9 of U.S. Pat. No. 6,256,998. This design has six valves which open and close in the sequence shown in FIG. 11.

U.S. Pat. No. 3,119,237 by W. E. Gifford shows an early pneumatically driven GM expander and a multi-ported rotary spool valve to control gas flow to the regenerator out of phase with gas flow to the drive piston. In a subsequent U.S. Pat. No. 3,205,668, Gifford discloses a multi-ported rotary disc valve that uses the high to low pressure difference to maintain a tight seal across the face of the valve. He states that this type of valve is superior to the spool type valve because the leak rate is lower, even after it has run a long time and has experienced some wear. This type of valve has been widely used in different types of GM refrigerators as shown for example in U.S. Pat. Nos. 3,620,029, 3,625,015, 4,987,743 and 6,694,749 B2.

This type of valve has the disadvantage of producing wear dust from the valve disc and/or valve seat. The wear dust from the valve disc tends to be blown into the cold head itself, which degrades performance. The pulse tube refrigerator is more sensitive to the dust than a conventional GM refrigerator because this dust tends to stick on the surface of the needles which are used to adjust the opening of the orifices at the warm end of the pulse tube, or to accumulate in the orifices and flow passages. The performance of a pulse tube refrigerator is sensitive to the opening of the orifices, thus it is desirable to keep them free of dust.

It has now been found that a rotary valve unit can be designed, that uses a thrust bearing to support the rotating valve disc relative to the valve seat such that the gap between them varies from light contact to a very small gap. This results in very little or no wear, and the torque required to turn the valve disc is reduced.

SUMMARY

This invention provides an improved means of reducing the wear dust and the torque required to turn a multi-port rotary disc valve by maintaining very light contact or a very small gap between the face of the valve disc and the seat. This invention provides means to reduce the wear dust and the torque by having a thrust bearing hold the valve seat and/or disc such that they are not in contact with each other, or have light contact each other.

The gap between the face of valve disc and seat can be maintained between 0 to 25 μm so that the leakage from high pressure to low pressure is small enough that it does not affect the performance of the refrigerator. If the valve disc is in light contact with the valve seat, most of the force will be exerted on the face of the thrust bearing instead of the face of the valve seat. Since the face of the valve disc and the face of thrust bearing rotate together, no wear will be generated during rotation and the torque required to turn the valve disc can be small.

The thrust bearing can be attached to the valve seat or the valve disc by a friction fit, or it can be attached with adhesive. The thrust bearing can also be held in position by a fixture.

It is possible to further reduce the torque required to turn a rotary disc valve that has multiple ports by reducing the net force that keeps the face of the valve disc in contact with the face of the thrust bearing. This invention also provides means to reduce the axial force exerted on the thrust bearing by having gas at two different pressures acting on two different surfaces in the valve assembly as shown in U.S. Pat. Nos. 4,987,743 and 6,694,749.

It is also possible to have high-pressure gas in the center of the valve seat and low-pressure gas on the outside of the valve disc as shown in U.S. Pat. No. 6,694,749. This provides an additional advantage, especially in a multi-ported pulse tube, further reducing the amount of dust, from the wear of the valve disc, which is blown into the pulse tube. Having the high pressure in the center of the valve disc face and low pressure on the outside results in most of the dust being blown directly to the low-pressure space and never entering the pulse tube.

A valve unit can also be designed such that, during early operation, the valve disc is in contact with the valve seat, but the valve disc or the valve seat is not in contact with the thrust bearing. After the valve unit has run for some time and has experienced some wear, the valve disc or seat slowly comes into contact with the face of the thrust bearing. The load exerted on the thrust bearing thus increases gradually, which results in the load exerted on the engaged faces of the valve seat and disc decreasing gradually. Eventually, the load exerted on the engaged faces of the valve seat and disc will become 0, and no further wear will be generated. In this case, there is almost no gap between the face of valve seat and disc, therefore, the leak rate from high pressure to low pressure can be maintained at a very small flow rate.

DETAILED DESCRIPTION OF THE INVENTION

The present invention is applicable to any kind of refrigerator in which gas is cycled in and out of the expander by a valve unit, including G-M refrigerators, Solvay refrigerators, and G-M type pulse tube refrigerators. It is of particular value when applied to low temperature pulse tubes that have multi-stages and multi-ports.

Figure 1:
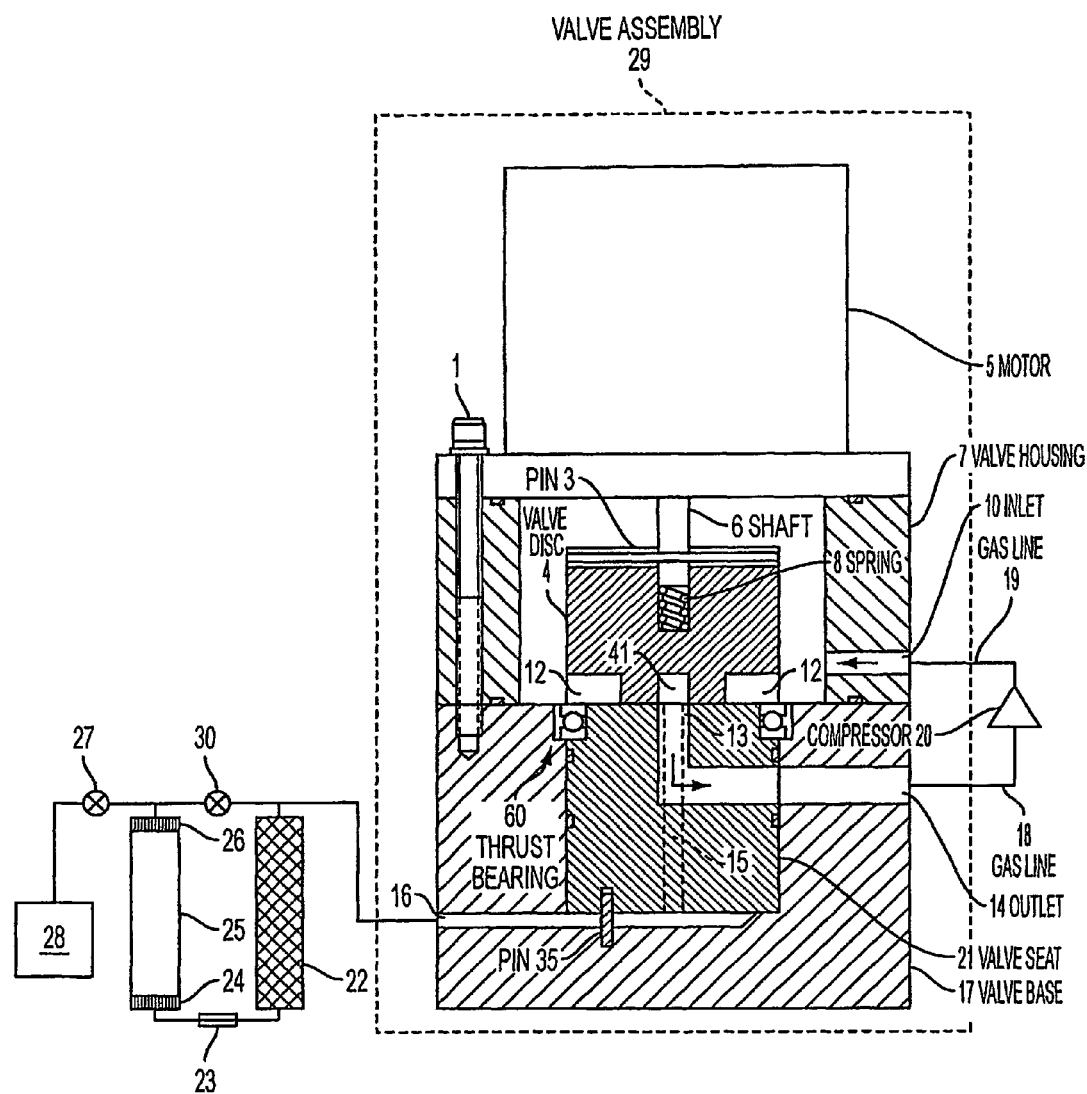
FIG. 1 is a cross section of a valve assembly in accordance with the present invention in which small schematics of the compressor and a single stage double inlet pulse tube refrigerator are included to show the flow relations. The valve seat is assembled with a thrust bearing attached; the valve disc is in contact with the surface of the thrust bearing.

FIG. 1 shows a cross section of valve assembly 29 along with small schematics of the compressor and a single stage double inlet pulse tube refrigerator to show the flow relations.

Valve unit 29 has a valve motor assembly 5, a valve housing 7 and a valve base 17, all of which are sealed by means of a variety of 'O'-ring seals, and by bolts 1. Inside the valve base and housing, there are various components. A valve seat 21 is held and sealed within the valve housing. A thrust bearing 60 is assembled with the valve seat. A valve disc 4 is turned by valve motor 5 through a motor shaft 6 and a pin 3 passing through shaft 6. Valve disc 4 is free to move axially relative to pin 3. Valve disc 4 is in contact with the face of thrust bearing 60. The valve disc 4 can be spaced apart from valve seat 21 by a very small gap or it can have very light contact with valve seat 21. If there is a gap between the face of valve disc 4 and valve seat 21, the preferred gap should be 0 to 25 µm. If the valve disc 4 is lightly in contact with valve seat 21, most of the force should be exerted on the face of the thrust bearing 60 instead of the face of the valve seat 21. Since the face of the valve disc 4 and the face of thrust bearing 60 rotate together, no wear will be generated during rotating and the required torque to drive the valve disc can be small. A spring 8 is used to keep valve disc 4 in contact with thrust bearing 60 when the refrigerator is off. Pin 35 prevents valve seat 21 from rotating relative to housing 17.

An inlet 10 is connected to the supply side of compressor 20 through a gas line 19. The return side of compressor 20 connects to valve assembly 29 through the gas line 18 and an outlet 14. Gas at low pressure then flows out of the center of valve disc 4 through channel 13.

The force, which is generated from the differential pressure between the supply pressure exerted on the distal face of the valve disc 4 and the pressure exerted on the face of valve disc 4, keeps the face of the valve disc 4 in contact with the face of the thrust bearing 60.

Figure 2:
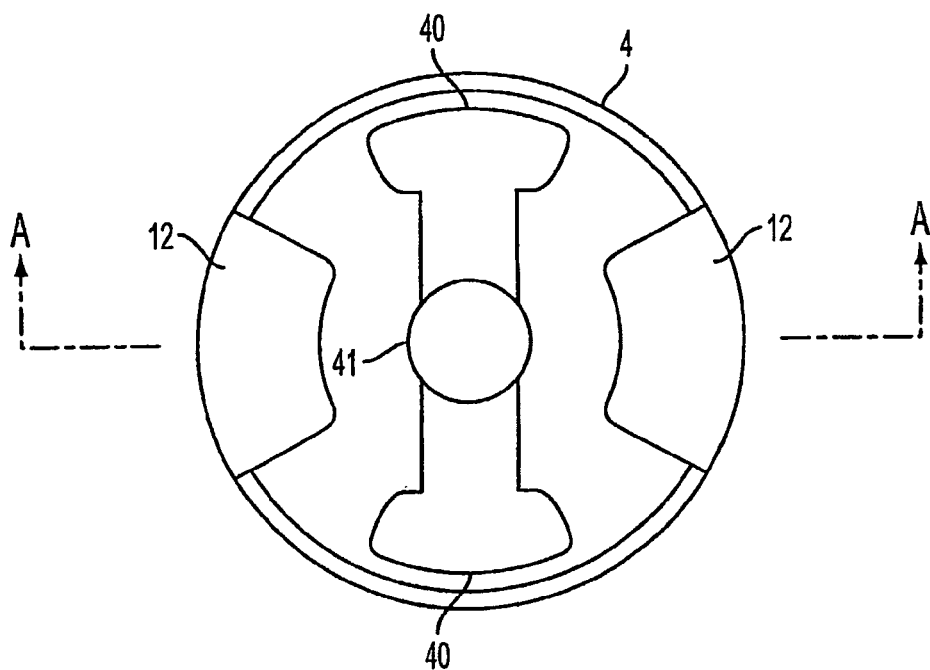
FIG. 2 is a face view of a valve disc forming part of the valve unit of FIG. 1.
Figure 3:
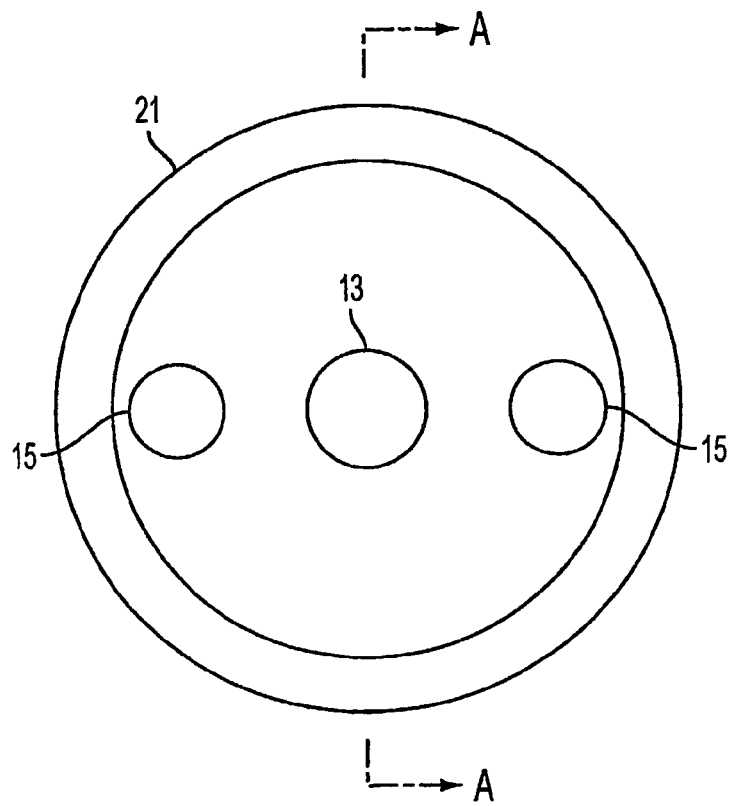
FIG. 3 is a face view of the valve seat forming part of the valve unit of FIG. 1.

FIG. 2 shows the gas flow cavities in the face of valve disc 4. The cross section shown in FIG. 1 is noted by section arrows A-A in FIGS. 2 and 3. Gas from ports 15 flows into cavities 40 then to low-pressure, Pl, port 13 through cross slot 41. Regions 12 that are under cut in the outer edge of valve disc 4 connect to high-pressure, Ph, gas that is supplied from the compressor FIG. 3 shows the face of seat 21. Although not essential to an understanding of the invention, the nature of this porting will be briefly described with reference to FIGS. 1, 2, and 3. FIG. 1 shows a double inlet type pulse tube refrigerator driven by the invented valve unit. It consists of a regenerator 22, a pulse tube 25 with warm end flow smoother 26 and cold end flow smoother 24, and a cold end heat exchanger 23. A phase shifter, which includes a buffer volume 28, a buffer orifice 27, and a double inlet valve 30. By rotating valve disc 4, by means of valve motor 5 and shaft 6, holes 15 and 16 are alternately pressurized by gas flowing through cavities 12 and depressurized by flow through slots 40. The porting shown in FIGS. 2 and 3 produce two complete cycles to pressurize and depressurize the pulse tube for every rotation of valve disc 4. It is to be understood that the expander can be operated with one, or more than one, cycle per cycle of the rotary valve by properly arranging the supply and return porting on valve disc 4 and valve seat 21.

Figure 9:
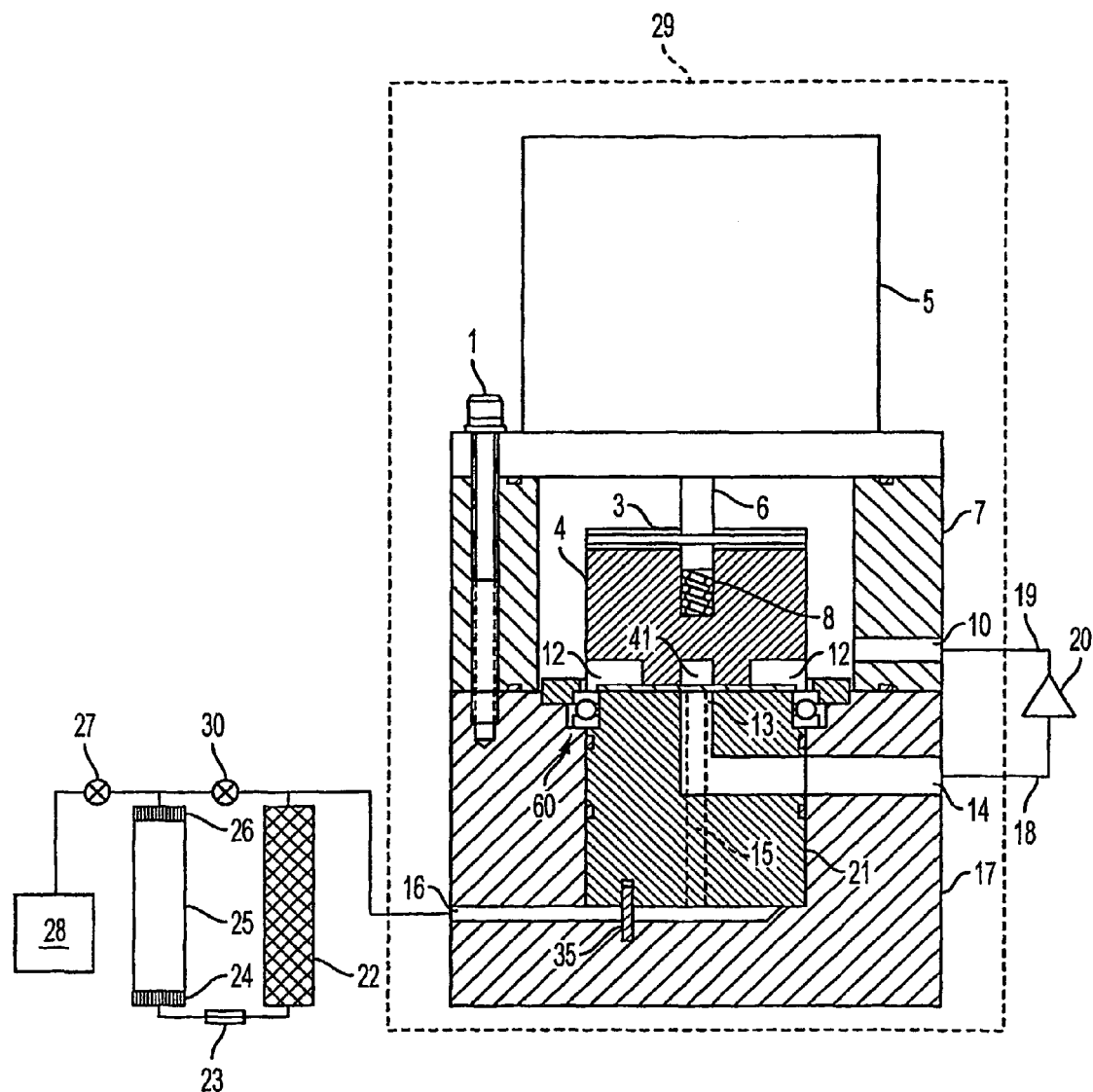
FIG. 9 is a cross section of a seventh embodiment of a valve assembly in accordance with the present invention in which the valve seat is assembled with a thrust bearing and the valve disc is in contact with the surface of the thrust bearing. The thrust bearing is fixed in the valve housing by a fixture.

Although the expander shown in FIG. 1 is a single stage pulse tube, it is also possible to design the valve unit and porting so that it can be used to drive a multi-stage pulse tube with multiple control ports as shown for example in FIG. 9 of U.S. Pat. No. 6,256,998. By properly arranging the porting on the valve disc 4 and the valve seat 21, and by arranging necessary passages to communicate with the warm end 26 of the pulse tube 25, the invented valve unit can also be used to drive any type of pulse tube refrigerator, such as, orifice type, four valve type, active-buffer type and five-valve type. It must be pointed out that this valve unit can be used for other kinds of refrigerators, such as GM or Solvay types.

Figure 4:
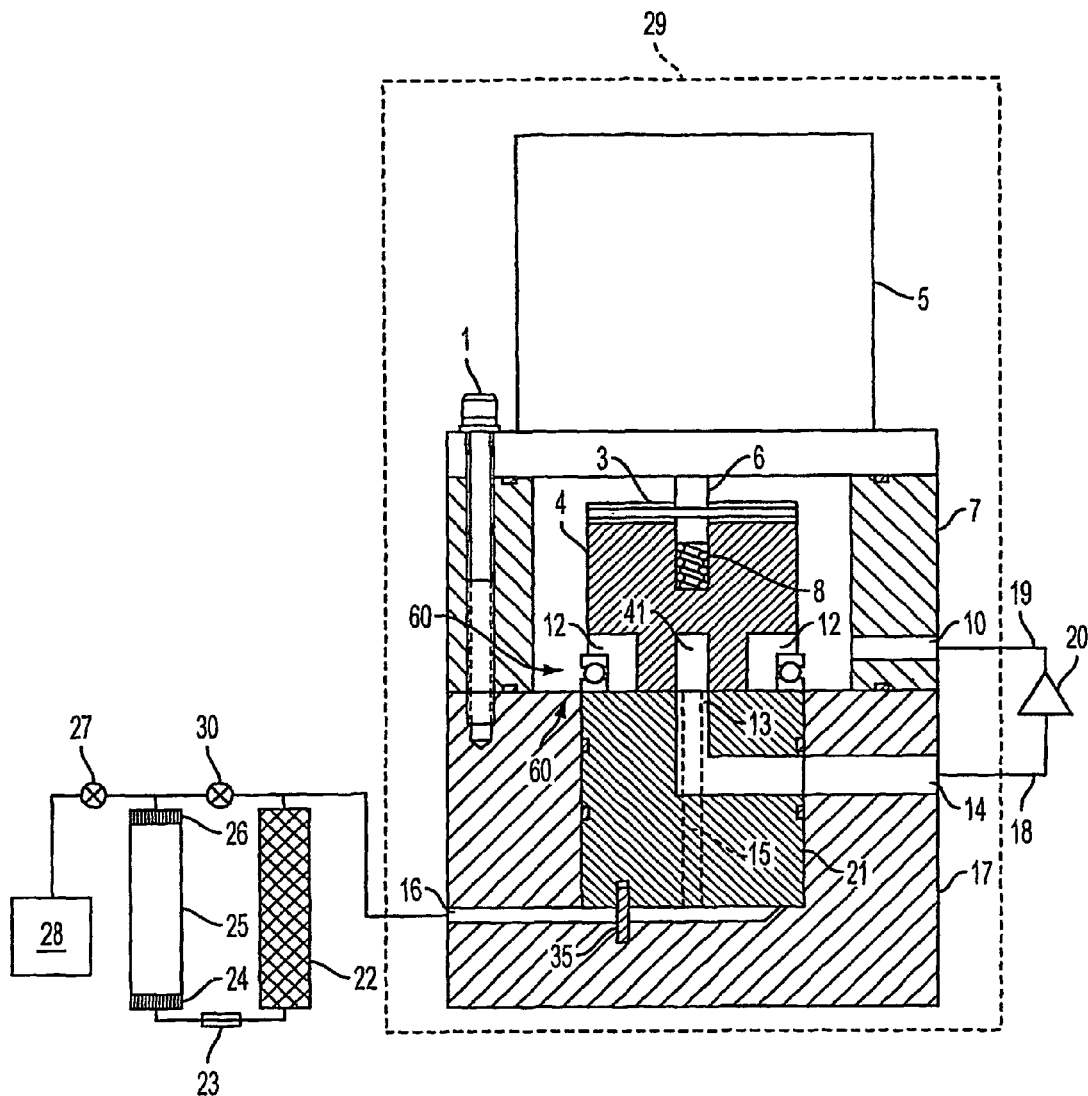
FIG. 4 is a cross section of a second embodiment of a valve assembly in accordance with the present invention in which the thrust bearing is attached to the valve disc and the valve seat is in contact with the surface of the thrust bearing.

FIG. 4 shows a second embodiment of the present invention in which thrust bearing 60 is attached to valve disc 4 and valve seat 21 is in contact with the surface of the thrust bearing 60. In FIG. 4, like references denote like parts in FIG. 1.

Figure 5:
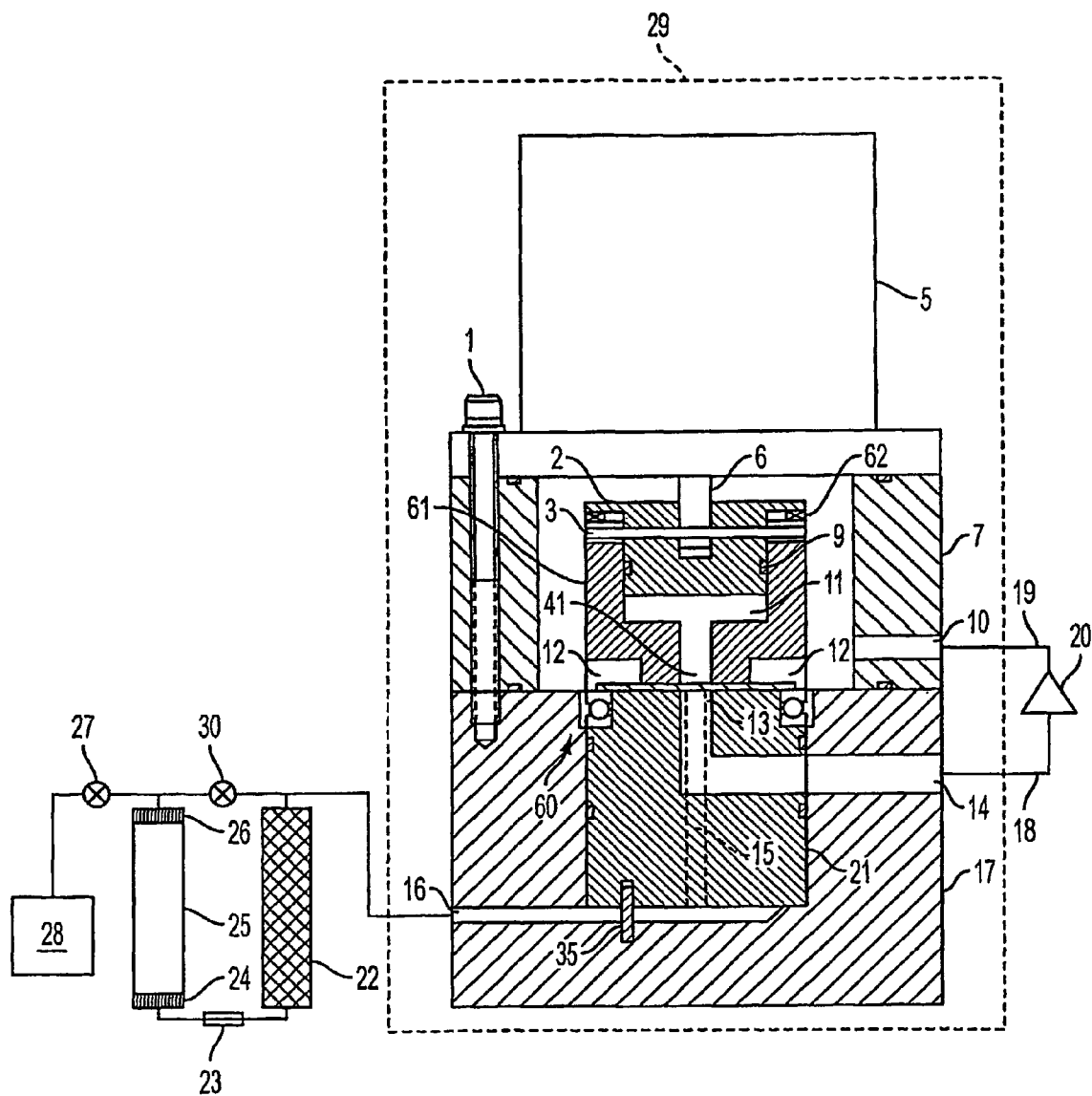
FIG. 5 is a cross section of a third embodiment of a valve assembly in accordance with the present invention in which the valve seat is assembled with a thrust bearing attached and the valve disc is in contact with the surface of the thrust bearing. Low pressure gas is introduced into a cavity enclosed by the valve disc and a valve holder.

FIG. 5 shows a third embodiment of the present invention in which thrust bearing 60 is attached to valve seat 21 and valve disc 61 is in contact with the surface of thrust bearing 60. In FIG. 5, like references denote like parts in FIG. 1. In FIG. 5, the force exerted on the thrust bearing 60 is reduced by having a valve holder 2 which is held by pin 3 and sealed in valve disc 61 by an 'O'-ring 9. The exterior surfaces of valve disc 61 and valve holder 2 are surrounded by high-pressure gas except for the surface of valve disc 61 that is in contact with thrust bearing 60 and the surface facing valve seat 21. The force required to keep the face of valve disc 61 in contact with the face of thrust bearing 60 is obtained by having the product of the pressures and areas on the distal side of valve disc 61 be greater than the product of the maximum average pressure on the face of valve disc 61 and the area of the face of valve disc 61. This can be expressed in the form of an equation in which Ac is the area of the distal side of valve disc 61 in cavity 11, As is the annular area of the distal side of valve disc 61 around Ac, Av is the area of the face of valve disc 61, and Pv is the average pressure acting on Av (both including the area and pressure of cavity 12), as $$(Ac*Pl+As*Ph)>Av*Pvmax \qquad \text{Equation 1}$$

The opposing force is transmitted to motor shaft 6 and puts an axial load on the motor bearings in the direction toward valve disc 61. In practice the diameter of cavity 11 is adjusted by testing different sizes to see what gives the best balance between maintaining a seal and minimizing the load on thrust bearing 60.

Figure 6:
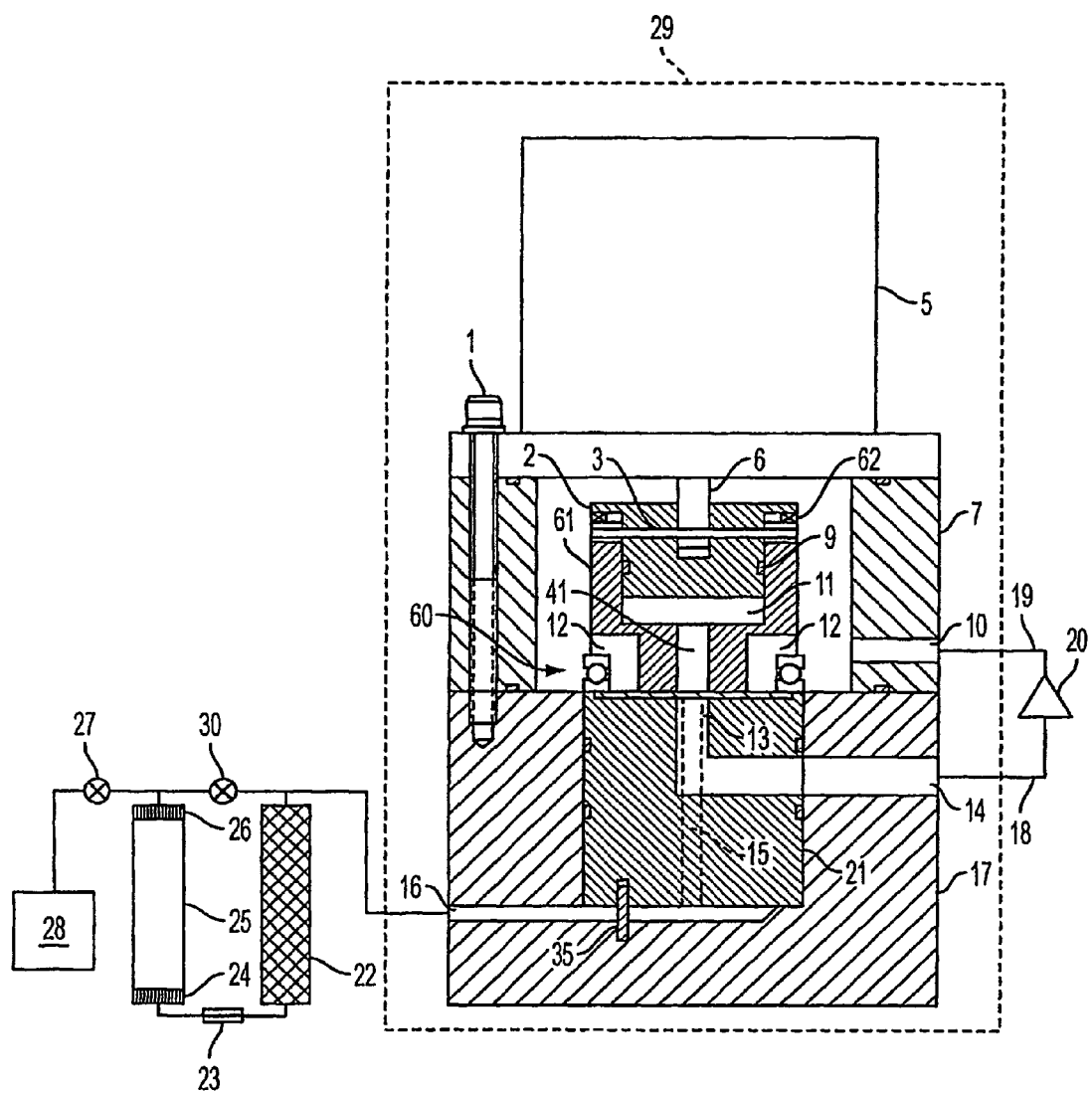
FIG. 6 is a cross section of a fourth embodiment of a valve assembly in accordance with the present invention in which the valve disc is assembled with a thrust bearing attached and the valve seat is in contact with the surface of the thrust bearing. Low pressure gas is introduced into a cavity enclosed by the valve disc and a valve holder.

FIG. 6 shows a fourth embodiment of the present invention in which thrust bearing 60 is attached to valve disc 61 and valve seat 21 is in contact with the surface of the thrust bearing 60. In FIG. 6, like references denote like parts in FIG. 5.

Figure 7:
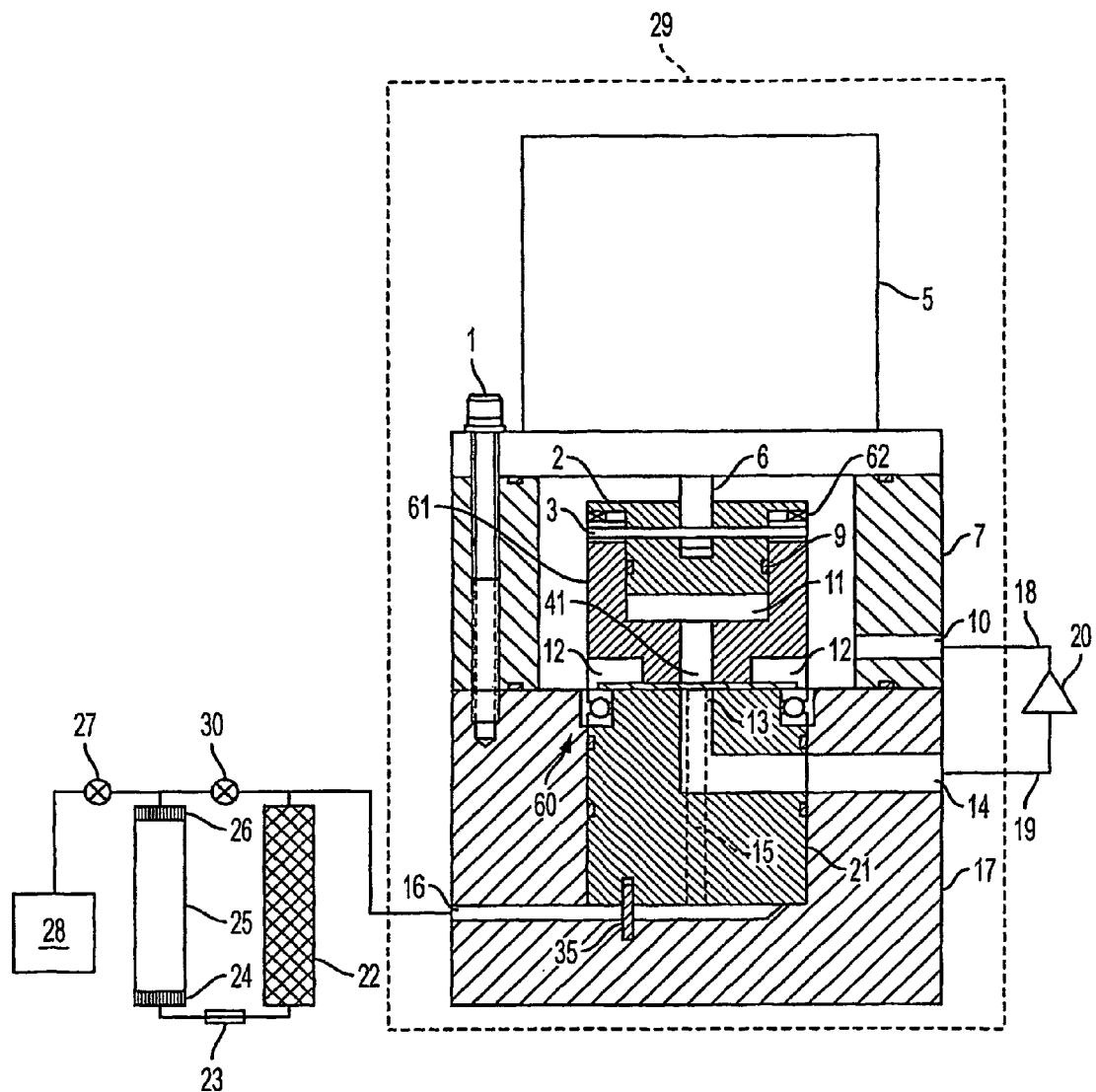
FIG. 7 is a cross section of a fifth embodiment of a valve assembly in accordance with the present invention in which the valve seat is assembled with a thrust bearing attached and the valve disc is in contact with the surface of the thrust bearing. High pressure gas is introduced into a cavity enclosed by the valve disc and a valve holder.

FIG. 7 shows a fifth embodiment of the present invention in which thrust bearing 60 is attached to valve seat 21 and valve disc 61 is in contact with the surface of the thrust bearing 60. In FIG. 7, like references denote like parts in FIG. 5. In FIG. 7, the exterior surfaces of valve disc 61 and valve holder 2 are surrounded by low-pressure gas except for the surface of valve disc 61 that is in contact with thrust bearing 60 and the surface facing valve seat 21. The force can be expressed in the form of an equation in which Ac is the area of the distal side of valve disc 61 in cavity 11, As is the annular area of the distal side of valve disc 61 around Ac, Av is the area of the face of valve disc 61, and Pv is the average pressure acting on Av (both including the area and pressure of cavity 12), as $$(Ac*Ph+As*Pl)>Av*Pvmax \qquad \text{Equation 2}$$

The opposing force is transmitted to motor shaft 6 and puts an axial load on the motor bearings in the direction away from valve disc 61. In equations 1 and 2 Av is equal the sum of Ac and As.

Having high pressure in the center of the valve disc face and low pressure on the outside results in most of the dust being blown directly to the low-pressure space and never entering the pulse tube.

Figure 8:
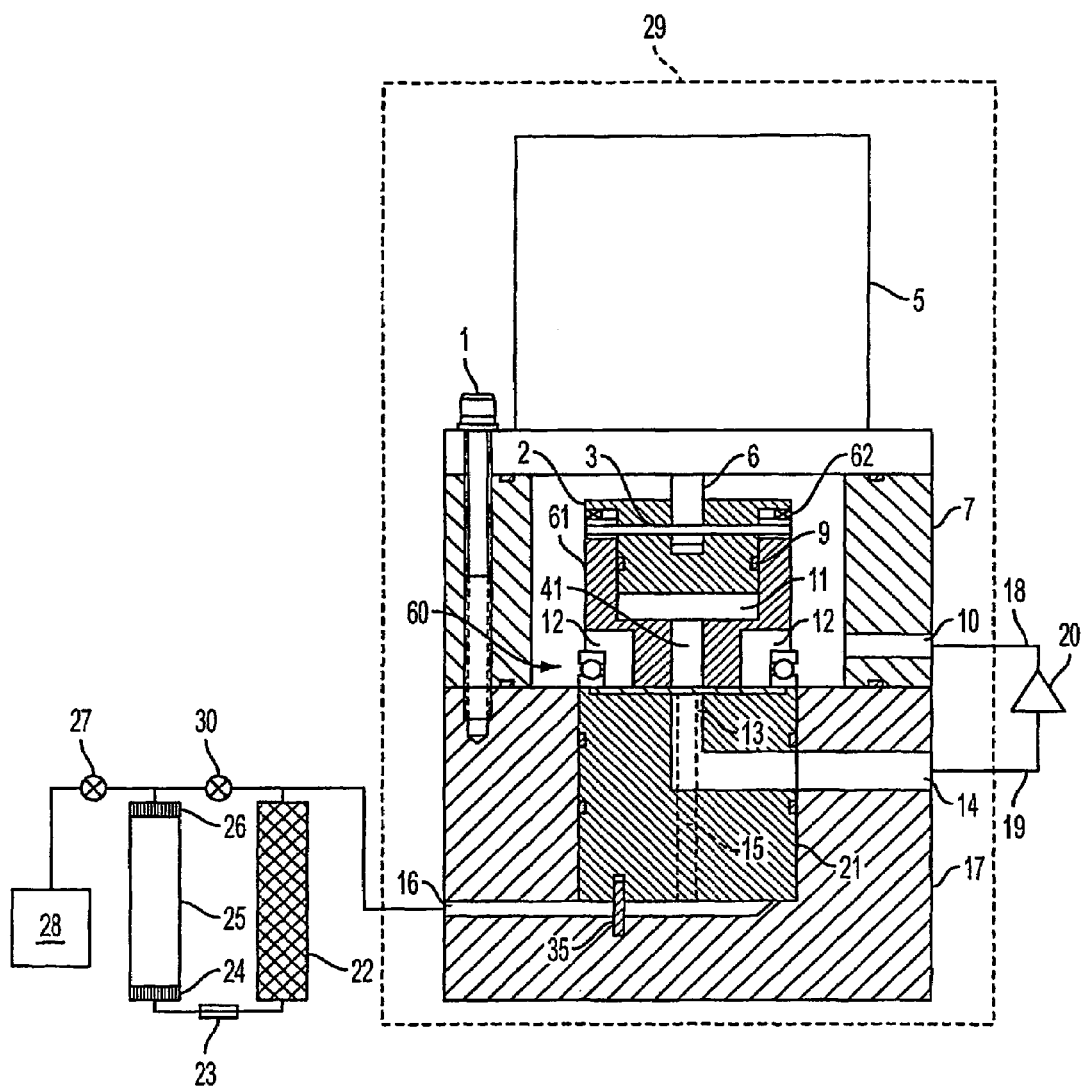
FIG. 8 is a cross section of a sixth embodiment of a valve assembly in accordance with the present invention in which the valve disc is assembled with a thrust bearing attached and the valve seat is in contact with the surface of the thrust bearing. High pressure gas is introduced into a cavity enclosed by the valve disc and a valve holder.

FIG. 8 shows a sixth embodiment of the present invention in which thrust bearing 60 is attached to valve disc 61 and valve seat 21 is in contact with the surface of the thrust bearing 60. In FIG. 8, like references denote like parts in FIG. 7.

FIG. 9 shows a seventh embodiment of the present invention in which a fixture is used to fix thrust bearing 60 to valve housing 17. Thrust bearing 60 rests on a shoulder of valve seat and valve disc 61 is in contact with the surface of thrust bearing 60. In FIG. 9, like references denote like parts in FIG. 1. This embodiment has the advantage of easy replacement of the thrust bearing if maintenance is needed.

Figure 10:
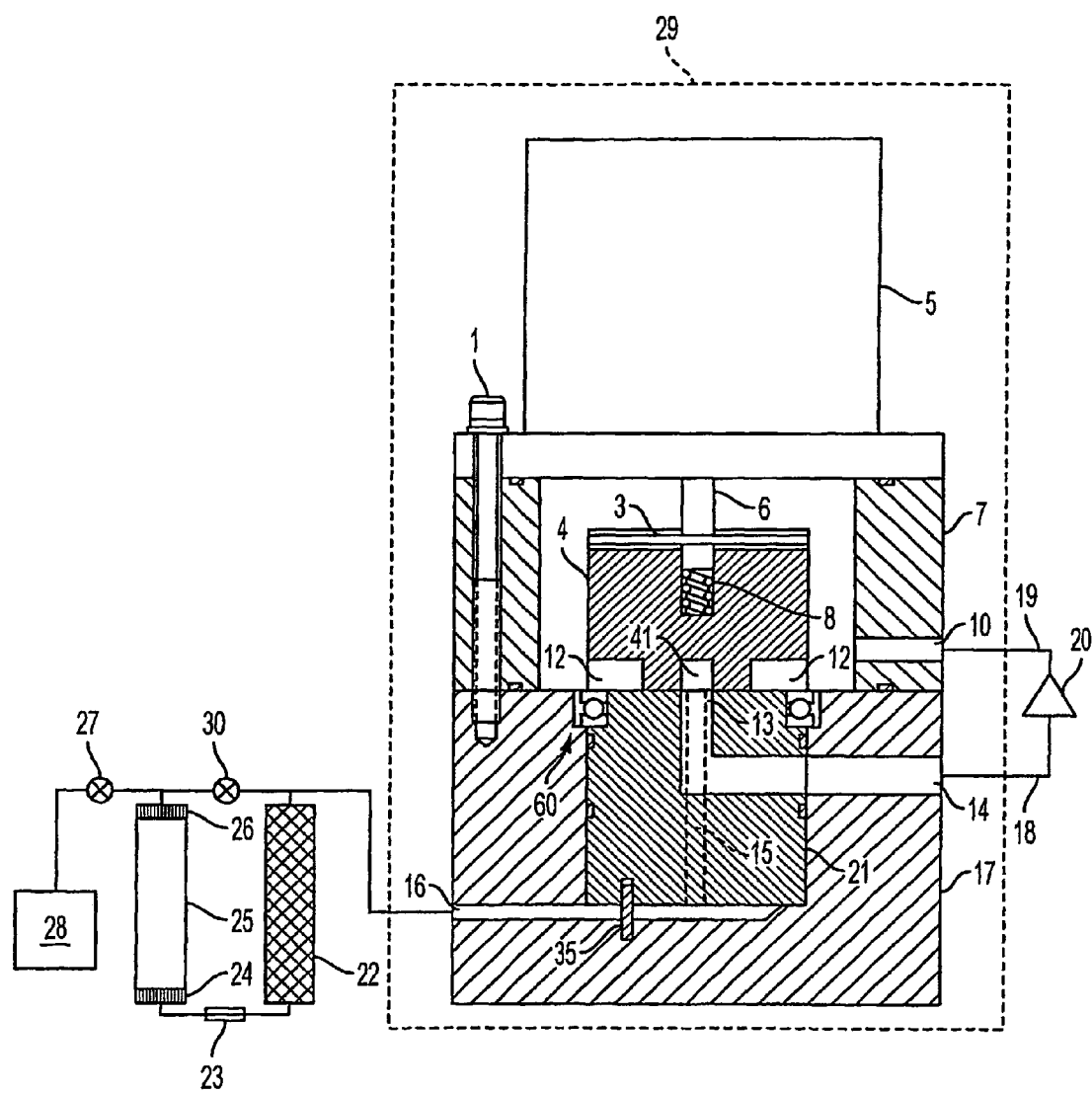
FIG. 10 is a cross sections of the initial status of a design option for the first embodiment of a valve assembly in accordance with the present invention in which the valve seat is assembled with a thrust bearing attached, and the valve disc is in contact with the face of the valve seat, but not in contact with the face of the thrust bearing.
Figure 11:
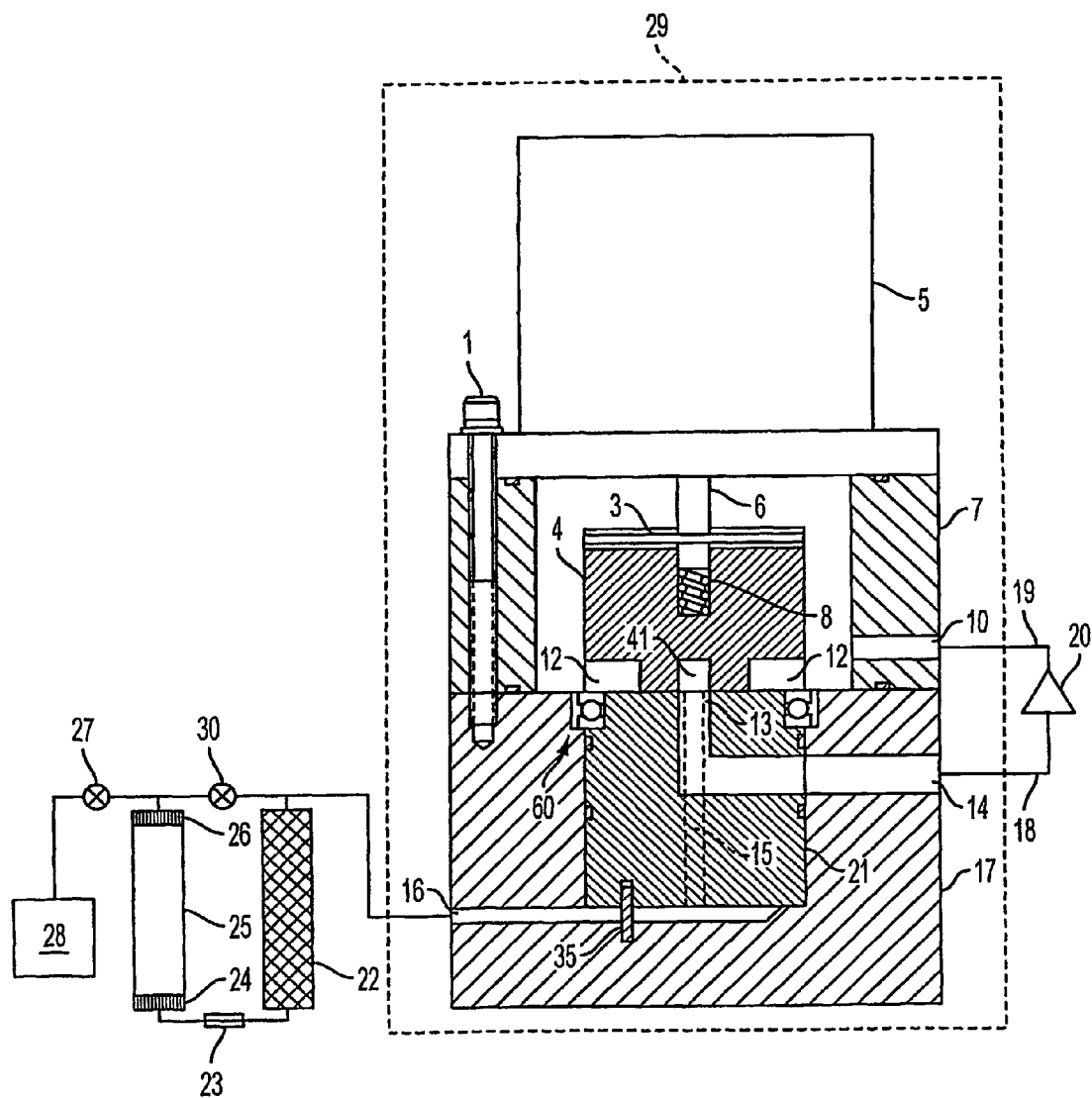
FIG. 11 is a cross sections of the valve assembly shown in FIG. 10 after an initial wear period which brings the valve disc to the normal operating status in which the valve disc is in contact with the face of the thrust bearing, and most of the load is exerted on the face of the thrust bearing, not on the engaged face of valve seat.

FIG. 10 and FIG. 11 show an option of a means to fabricate the first embodiment of the present invention. During initial operation valve disc 4 is in contact with the face of valve seat 21, but not in contact with the face of the thrust bearing 60. After the valve unit has run for some time and has experienced some wear, valve disc 21 starts to be in contact with the face of the thrust bearing 60. Then the load exerted on the thrust bearing 60 starts to increase gradually, which results in the load exerted on the engaged faces of valve seat 21 and disc 4 decreasing. At some point, the load exerted on the engaged faces of the valve seat 21 and disc 4 becomes 0 and no further wear will be generated. In this case, there is almost no gap between the face of valve seat 21 and disc 4, therefore, the leak rate from high pressure to low pressure can be maintained at a very small value.

The invention claimed is:

1. In a GM, Solvay, or GM type pulse tube refrigerator a valve assembly comprising at least a valve disc and at least a valve seat and at least a thrust ball bearing in which one of the face of the valve disc and the face of valve seat is in contact with the face of the thrust ball bearing, wherein the thrust ball bearing is arranged between the valve disc and the valve seat, and there is no contact between the face of the valve disc and the face of the valve seat.

2. A valve assembly in accordance with claim 1 in which the thrust ball bearing is attached to the valve seat and the face of the valve disc is in contact with the face of the thrust ball bearing.

3. A valve assembly in accordance with claim 1 in which the thrust ball bearing is attached to the valve disc and the face of the valve seat is in contact with the face of the thrust ball bearing.

4. A low torque, reduced wear rotary valve unit comprising a valve disc, a valve seat, and a thrust ball bearing, wherein the thrust ball bearing supports the rotating valve disc relative to the valve seat such that a very small gap is formed by arranging the thrust ball bearing between the valve disc and the valve seat, and there is no contact between a face of the valve disc and a face of the valve seat.

5. The valve unit of claim 4 in which the very small gap is less than 25 μm.

* * * * *

UNITED STATES PATENT AND TRADEMARK OFFICE
CERTIFICATE OF CORRECTION

PATENT NO. : 7,631,505 B2  Page 1 of 1
APPLICATION NO. : 10/581962
DATED : December 15, 2009
INVENTOR(S) : Eric Seitz et al.

It is certified that error appears in the above-identified patent and that said Letters Patent is hereby corrected as shown below:

Title Page, item (73) should read as follows:

(73) Assignees: Sumitomo Heavy Industries, Ltd., Tokyo (JP); Sumitomo (SHI) Cryogenics of America, Inc., Allentown, PA (US)

Signed and Sealed this

Fourth Day of May, 2010

David J. Kappos
*Director of the United States Patent and Trademark Office*